(12) United States Patent
DeVivi

(10) Patent No.: US 6,581,351 B2
(45) Date of Patent: Jun. 24, 2003

(54) FLOORING

(76) Inventor: David C. DeVivi, 2279 Tom Allen Rd., Waterloo, NY (US) 13165

( * ) Notice: Subject to any disclaimer, the term of this patent is extended or adjusted under 35 U.S.C. 154(b) by 0 days.

(21) Appl. No.: 09/846,336

(22) Filed: May 2, 2001

(65) Prior Publication Data

US 2002/0017071 A1 Feb. 14, 2002

Related U.S. Application Data

(60) Provisional application No. 60/201,298, filed on May 2, 2000.

(51) Int. Cl.[7] .................................................. E04B 2/08
(52) U.S. Cl. ..................... 52/592.1; 52/589.1; 52/591.1; 403/334; 403/381
(58) Field of Search ......................... 52/533, 539, 595, 52/592.1, 592.4, 591.1, 589.1, 588.1; 403/334, 381, 345

(56) References Cited

U.S. PATENT DOCUMENTS

| | | | | |
|---|---|---|---|---|
| 2,823,433 A | * | 2/1958 | Kendall | |
| 5,165,816 A | * | 11/1992 | Parasin | 403/334 |
| 5,182,892 A | * | 2/1993 | Chase | 52/539 |
| 5,335,473 A | * | 8/1994 | Chase | 52/745.08 |
| 5,618,602 A | * | 4/1997 | Nelson | 428/60 |
| 5,899,251 A | * | 5/1999 | Turner | 144/347 |
| 6,029,416 A | * | 2/2000 | Andersson | 52/592.1 |
| 6,098,365 A | * | 8/2000 | Martin et al. | 52/592.1 |
| 6,145,261 A | * | 11/2000 | Godfrey et al. | 52/302.1 |
| 6,247,285 B1 | * | 6/2001 | Moebus | 52/589.1 |
| 6,438,919 B1 | * | 8/2002 | Knauseder | 52/586.2 |

* cited by examiner

Primary Examiner—Yvonne M. Horton
(74) Attorney, Agent, or Firm—Shlesinger, Arkwright & Garvey LLP

(57) ABSTRACT

A flooring member comprising a top, a bottom, a first edge, a second edge, a tongue member configured to be received within a groove member of an adjacent flooring member, the tongue member extending generally perpendicular from the first edge and having a top surface and a bottom surface, the tongue member top surface is inclined away from the flooring member top at a first angle, the tongue member bottom surface is inclined toward said flooring member top at a second angle, the second angle being less than the first angle so that a gap resistant interconnection of the tongue within a groove of an adjacent flooring member is achieved.

7 Claims, 1 Drawing Sheet

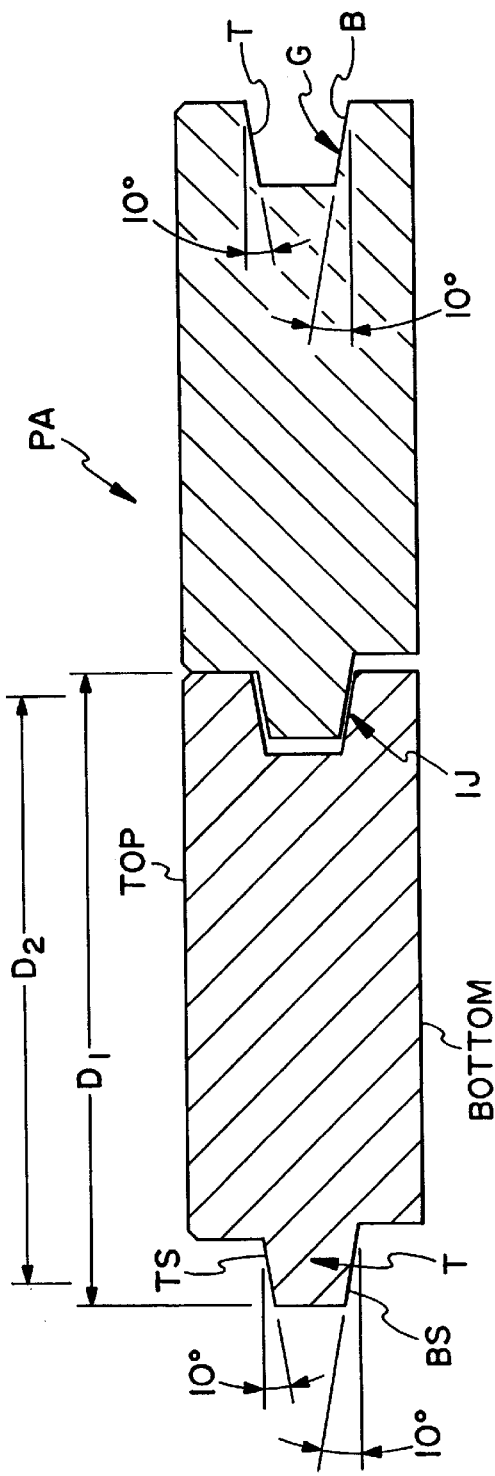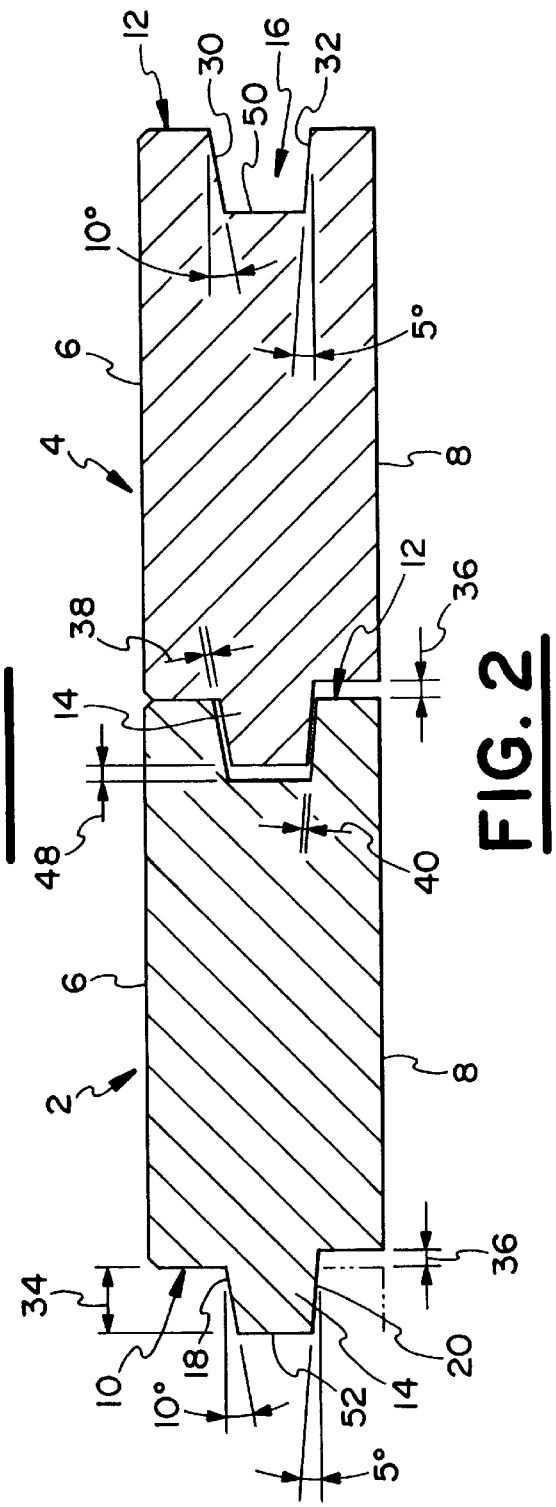

FLOORING

CROSS-REFERENCE TO RELATED APPLICATIONS

This is a nonprovisional application claiming the priority of provisional application Serial No. 60/201,298, filed May 2, 2000, of which is hereby incorporated by reference.

FIELD OF THE INVENTION

The present invention relates to flooring and in particular, wood flooring having tongue and groove construction.

BACKGROUND OF THE INVENTION

Custom wood flooring having tongue and groove construction is well known. In recent years, homes containing such flooring are also known to be provided with radiant heating systems underneath the floors. These heating systems have caused some problems for mechanically interfit wooden flooring installed in the homes.

In particular, heating of the flooring in the winter and cooling of the flooring at other times of the year will cause the flooring to expand or contract and thereby affects the interfit between adjacent pieces of flooring. This is known to be a cause of squeaking floors.

The flooring of the present invention eliminates the above problem by maintaining tight pressure between adjacent interfit pieces of installed flooring irrespective of any heating or cooling which may occur to the flooring or change in the moisture content of the wood. In addition, the present invention provides a faster and more economical installation of tongue and groove flooring.

BRIEF DESCRIPTION OF THE DRAWINGS

FIG. 1 is a cross-sectional view of prior art flooring showing the interfit of two adjacent boards; and FIG. 2 is a cross-sectional view of flooring according to the present invention and showing interfit between two adjacent boards.

DETAILED DESCRIPTION OF THE PREFERRED EMBODIMENTS

FIG. 1 of the drawings illustrates prior art flooring PA and in particular an end view of two adjacent flooring boards interconnected along respective tongue and grooves. The tongue T is provided along one edge of the board while a groove G is provided along an opposite edge on the other side of the board. In this prior art flooring, the tongue T includes an inclined top surface TS and an inclined bottom surface BS each of which are inclined relative to the top (or bottom) of the flooring board at an angle of about 10 degrees. The groove G likewise includes a respective top T and bottom B surfaces inclined at an angle of about 10 degrees as shown. To secure two adjacent interconnected boards, a nail (not shown) is provided and extends between the two adjacent flooring boards so that the respective tongue and groove of separate flooring boards are connected at interconnection joint IJ. The length of the tongue is shown to be about one quarter of an inch. The tolerance between the bottom (or pressure) surface of the tongue and the bottom surface of the groove of an adjacent piece of flooring board is shown to be five one thousands of an inch. The tolerance between the top edge of the tongue and the adjacent groove of the next piece of flooring is shown to be ten one thousands of an inch.

As noted above, flooring constructed from wood has a variable moisture content. Floor heating systems cause the wood flooring of the type shown in FIG. 1, as well as other prior art wood flooring, to shrink and if such shrinkage is greater than one sixteenth of an inch in face width, the mechanical fit between adjacent flooring boards become loose thereby causing the floor to squeak or otherwise make noise as the floor is being used due to the application of pressure against the floor boards. Distances D1 and D2 of FIG. 1 represent variations of width of the flooring from summer to winter respectively.

The present invention provides flooring that will not be affected by changes in the dimensional width of the board due to seasonally induced or other variation of the moisture content of the board. In addition, the present invention provides a flooring board of tongue and groove construction for use with relatively wide flooring boards (five inches or greater) and relatively longer flooring boards (five feet or greater) yet still provide ease of installation during construction of such floors.

Turning to FIG. 2, identical interconnected flooring boards 2 and 4 according to the present invention are shown. Each flooring board includes a top 6, a bottom 8 and side edges 10 and 12. Each length of flooring board will necessarily terminate at respective end portions (not shown). Side edge 10 is provided with a tongue 14 and the opposite side edge 12 is provided with a groove 16. As is apparent, the tongue and groove of each flooring board will be sized to interfit a groove and tongue of a separate flooring board so that a complete floor may be constructed from a series of interfitted flooring boards.

Tongue 14 includes a top surface 18 and a bottom surface 20. The top surface 18 of the tongue is inclined relative to the top 6 of the flooring 2. The embodiment of FIG. 2 shows an incline of about ten degrees. The bottom surface 20 of the tongue is also inclined relative to the top 6 of the flooring 2. According to the present invention, the degree of incline for the bottom surface 20 will be less than that of top surface 18. In the embodiment of FIG. 2, the incline is of bottom surface 20 is shown to be about five degrees. As is apparent, the incline or slope of the top surface or bottom surface may vary so long as the incline of the bottom surface 20 is less than that of the top surface 18.

Groove 16 is provided with a top surface 30 and a bottom surface 32. Top surface 30 of groove 16 is inclined relative to the top 6 of the flooring 4. The embodiment of FIG. 2 shows an incline of about ten degrees. The bottom surface 32 is also inclined relative to the top 6 of the flooring 4. According to the present invention, the degree of incline for the bottom surface 32 is less than that of top surface 30. The embodiment of FIG. 2 shows an incline of about five degrees. As is apparent, the incline or slope of the top surface or bottom surface may vary so long as the incline of the bottom surface 32 is less than that of the top surface 30.

In the embodiment shown in FIG. 2, tongue 14 is shown to have a length 34 of about ¼ inch. When two sections of flooring 2 and 4 are interconnected, a 1/16 of an inch gap is provided between the adjacent edges of flooring boards 2 and 4 at clearance 36 while clearance gap 38 provided between surfaces 18 and 30 is about 0.010 inch and clearance gap 40 is about 0.005 inches. A clearance gap 48 of about 1/16 of an inch is also provided between surface 50 of groove 16 and surface 52 of tongue 14. Other clearance gaps are within the scope of the present invention particularly if the width, thickness and length of the flooring in modified.

The reduced angle of incline for bottom surface 20 relative that of the top surface 18 of the tongue 14 (and the top surface 30 relative to the bottom surface 32 of the groove 16) is provided to enhance contact between two interconnected boards of flooring at the so-called pressure surface region of the interconnected boards. If a dimensional change in the board is caused by heating or a reduction in moisture content of the wood, contact between the interconnected boards of the present invention along the pressure surface regions will be maintained. The pressure surface region is the region of contact between the bottom surface 20 of the tongue and the bottom surface 32 of the groove 16 of an adjacent flooring board. This surface region of a interconnected tongue and groove boards is subjected to significant pressure due to the weight of users walking on the assembled flooring. Accordingly, if the flooring board of the present invention shrinks, contact between the interconnected boards at the pressure surfaces will be maintained thereby reducing and/or eliminating squeaking as an individual walks on the flooring. This bottom (or pressure) edge angle of the tongue relative to the top edge angle of the tongue provides flooring which remains tightly interfit following installation, regardless of the temperature changes to the flooring.

As is apparent, the tongue and groove according to the present invention may be provided at the ends of respective boards to join two boards end to end.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

I claim:

1. A flooring member comprising:
   a) a top;
   b) a bottom;
   c) a first edge, said first edge extending from said top to said bottom;
   d) a second edge, said second edge extending from said top to said bottom;
   e) a tongue member configured to be received within a groove member of an adjacent flooring member, said tongue member extending generally perpendicular from said first edge and having a top surface and a bottom surface, said tongue member top surface is inclined away from said flooring member top at a first angle, said tongue member bottom surface is inclined toward said flooring member top at a second angle; and
   f) a groove member configured to receive a tongue member of an adjacent flooring member, said groove member extending within said second edge and generally perpendicular thereto and having a top surface and a bottom surface, said groove member top surface is inclined away from said flooring member top at a first angle, said groove member bottom surface is inclined toward said flooring member top at a second angle, each of said second angles is less than each of said first angles.

2. A flooring member as in claim 1 and wherein:
   a) each of said first angles is at least twice that of each of said second angles.

3. A flooring member as in claim 1 and wherein:
   a) each of said first angles is about ten degrees and each of said second angles is about five degrees.

4. A flooring member as in claim 1 and wherein:
   a) said tongue member top surface having a length greater than said tongue member bottom surface.

5. A flooring member as in claim 1 and wherein:
   a) said flooring member is constructed from wood.

6. A flooring member as in claim 1 and wherein:
   a) said tongue member bottom surface is longer than said tongue member top surface.

7. A flooring member comprising:
   a) a top;
   b) a bottom;
   c) a first edge, said first edge extending from said top to said bottom;
   d) a second edge, said second edge extending from said top to said bottom;
   e) a tongue member configured to be received within a groove member of an adjacent flooring member, said tongue member extending generally perpendicular from said first edge to said second edge and having a top surface and a bottom surface, said tongue member top surface is inclined away from said flooring member top;
   f) a groove member configured to receive a tongue member of an adjacent flooring member, said groove member extending within said second edge and generally perpendicular thereto and having a top surface and a bottom surface, said groove member top surface is inclined away from said flooring member top; and
   g) means for maintaining contact of said tongue member against a groove member of an adjacent interconnected flooring member following shrinkage of said flooring member, said means provided on each of said tongue member bottom surface and said groove member bottom surface.

* * * * *